FREQUENCY-MODULATED SUBCARRIER DETECTOR

Filed Jan. 24. 1961 2 Sheets-Sheet 1

Aug. 25, 1964 B. D. LOUGHLIN 3,146,402

FREQUENCY-MODULATED SUBCARRIER DETECTOR

Filed Jan. 24, 1961 2 Sheets-Sheet 2

3,146,402

FREQUENCY-MODULATED SUBCARRIER DETECTOR

Bernard D. Loughlin, Huntington, N.Y., assignor to Hazeltine Research, Inc., a corporation of Illinois Filed Jan. 24, 1961, Ser. No. 84,636
5 Claims. (Cl. 329—126)

*General*

Figure 1:
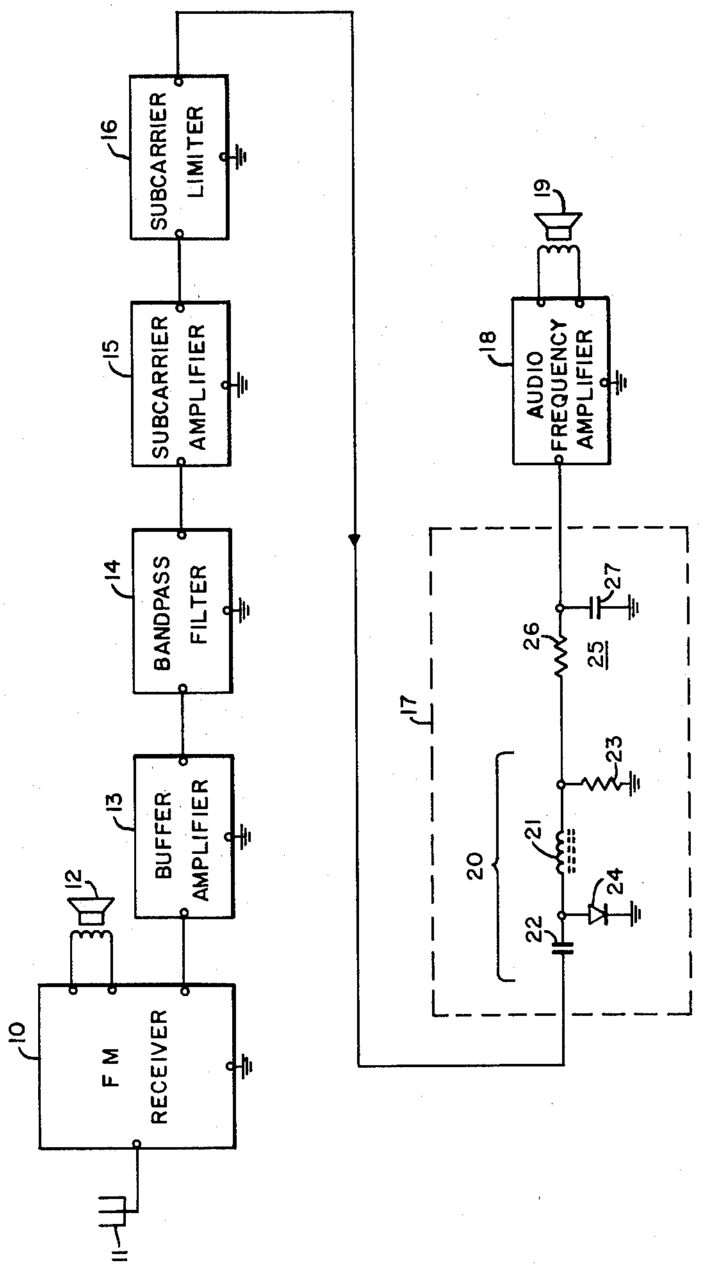

This invention relates to apparatus for detecting the modulation of a frequency-modulated signal and has general application for measuring the repetition rate of any repetitive signal. The apparatus has particular application in improving the audio recovery of a counter-type detector used to detect the modulation of a frequency-modulated subcarrier of a frequency-modulated multiplex signal. The invention will, therefore, be described in this environment.

The frequency-modulated multiplex signal mentioned above may be an SCA (Subsidiary Communications Authorization) type signal wherein a subcarrier in the order of 50 kilocycles is frequency-modulated by a subcarrier modulating signal. The main carrier, in the order of 100 megacycles and representative of an FM broadcast channel frequency, is frequency-modulated by both a main modulating signal and the frequency-modulated subcarrier signal. Thus, two modulating signals are transmitted in one channel and on one main carrier which is representative of the channel frequency. At the receiving end, the main modulating signal and subcarrier are detected and separated and the subcarrier modulating signal, in turn, is detected from the subcarrier.

The main modulating signal may be the usual program material and the subcarrier modulating signal may be the familiar subscription type material heard as background music in restaurants, stores, and offices. In another form, this multiplex technique may be used for stereo broadcasting.

The conventional technique of detecting the modulation of the frequency-modulated subcarrier signal with a counter-type detector is to amplify and limit the subcarrier signal and to then differentiate the limited signal. Next, either the positive or negative differentiated pulses are counted or integrated in an integrating circuit to derive an audio-frequency signal having an amplitude which varies in proportion to changes in the repetition-frequency of the pulses which are counted and which is, therefore, representative of the modulation of the frequency-modulated subcarrier signal. The amplitude of this audio-frequency signal naturally is dependent upon the area under or the energy of the differentiated pulses which are counted. Any attempt to increase the amplitude of the audio-frequency signal by merely increasing the time constant of the differentiating circuit to derive differentiated pulses having longer durations and higher average amplitudes results in degradation of the linearity of the detector since at high frequencies the differentiated pulses will have insufficient time to decay to approximately zero before the occurrence of the next differentiated pulse. In order to derive an audio-frequency signal which is truly representative of the modulation of the frequency-modulated subcarrier signal, it is necessary that the amplitude variations of this audio-frequency signal be dependent only upon the changes in repetition frequency of the pulses counted. Variations in amplitude due to changes in the energy content of the pulses which are counted result in loss of linearity; the energy content of the pulses which are counted must be constant.

The present invention is directed to a detector wherein these pulses which are counted are formed or shaped to have a greater area or energy content than the energy content of conventionally derived differentiated pulses and when counted these pulses do not cause the linearity of the detector to be degraded. This provides an audio-frequency signal at the output of the detector which has a greater amplitude than one derived by conventional techniques and this detector is said to have an improved audio recovery.

In accordance with the present invention apparatus for measuring the repetition rate of a repetitive signal comprises means for amplitude-limiting the repetitive signal and differentiating means for deriving from the amplitude-limited signal a series of pulses. The apparatus additionally includes means for shaping each pulse in the series whereby each pulse so shaped has a higher energy content than corresponding ones of the series derived by the differentiating means. The apparatus also includes means for rectifying the shaped series of pulses retaining a series of same polarity pulses which could be obtained from the series of pulses derived by the differentiating means whereby the output of the apparatus is substantially enhanced.

For a better understanding of the present invention, together with other and further objects thereof, reference is had to the following description, taken in connection with the accompanying drawings, and its scope will be pointed out in the appended claims.

Figure 2A:
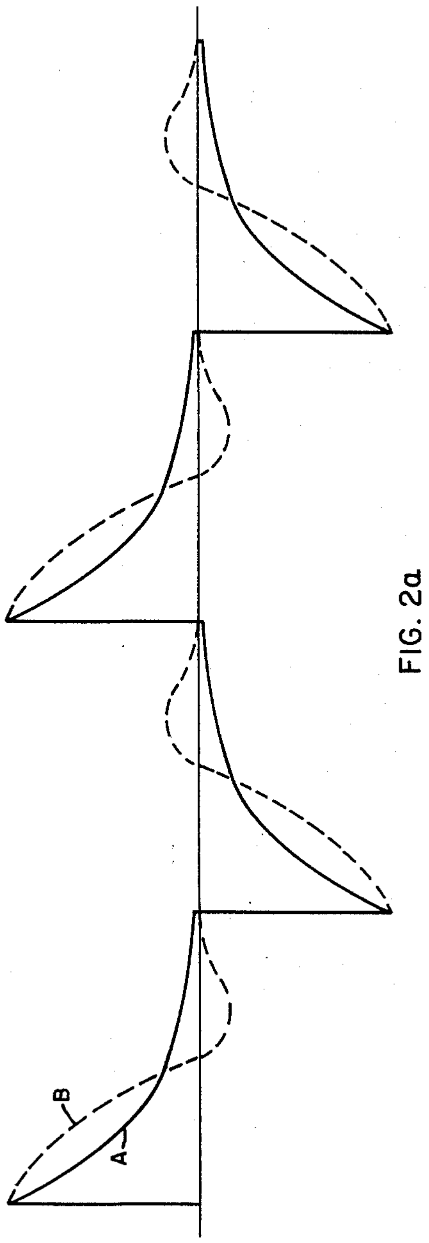
Figure 2B:
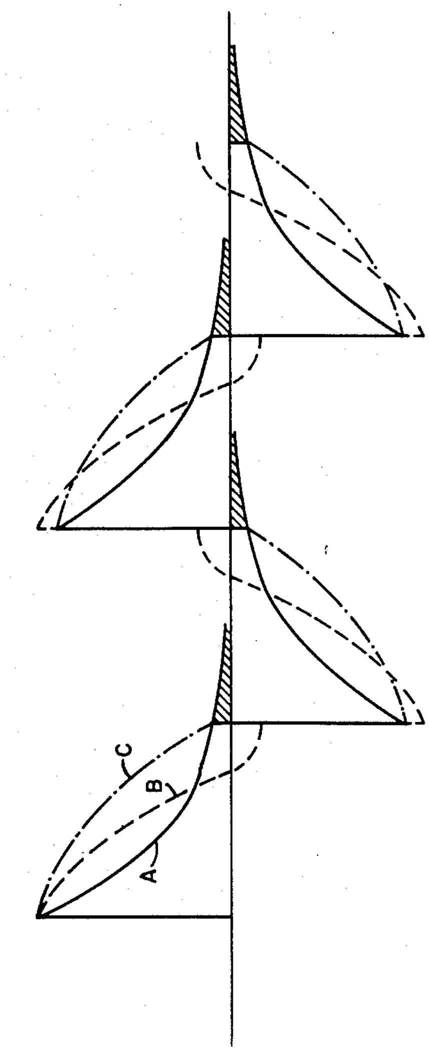

Referring to the drawings:

FIG. 1 is a circuit diagram, partly schematic, representing a complete frequency-modulation carrier signal receiver along wtih a subcarrier unit which includes apparatus for detecting the modulation of a frequency-modulated subcarrier signal constructed in accordance with the present invention, and FIGS. 2*a* and 2*b* show voltage wave forms useful in understanding the advantages of the detector apparatus of the present invention.

*Description and Operation of FIG. 1 Apparatus*

Referring to FIG. 1 there is represented a complete frequency-modulated carrier signal receiver 10 of conventional construction along with a subcarrier unit which includes apparatus for detecting the modulation of a frequency-modulated subcarrier signal constructed in accordance with the present invention. The receiver 10 may include the usual circuits normally found in such a device. In particular, the receiver 10, having its input terminal connected to an antenna 11, may include a radio-frequency amplifier, an oscillator-modulator, an intermediate-frequency amplifier, a frequency-modulation detector, and an audio-frequency amplifier, all of conventional construction for deriving, in the usual manner, an audio-frequency signal representing the main modulating signal. Such a signal may be reproduced, in a conventional manner, by a sound reproducer 12.

Connected in cascade with the receiver 10 is a subcarrier unit composed of a buffer amplifier 13, a bandpass filter 14, a subcarrier amplifier 15, a subcarrier limiter 16, a subcarrier detector 17 shown within dotted lines and more fully described hereinafter, an audio-frequency amplifier 18, and a sound reproducer 19. All the elements in the subcarrier unit except for the subcarrier detector 17 may be of conventional construction and operate in the usual manner. The input circuit of the buffer amplifier 13 is connected to the detector output, before de-emphasis, of the receiver 10. The buffer amplifier 13 serves to isolate the relatively low impedance of the bandpass filter 14 from the relatively high impedance of the detector in the receiver 10. The buffer amplifier 13 should be designed so that its distortion is minimized since harmonics of the main modulating signal may fall within the subcarrier pass band and result in crosstalk. The bandpass filter 14, having a pass band substantially equal to the maximum frequency deviation of the subcarrier signal and centered approximately at the subcarrier frequency passes the subcarrier signal and further attenuates the main channel audio-frequency signal developed by the detector of the receiver 10 as well as noise signals in the frequency range above and below this pass band. The subcarrier signal, in turn, is amplified by the subcarrier amplifier 15 and is amplitude limited by the subcarrier limiter 16. The amplitude-limited subcarrier signal is supplied to the subcarrier detector 17, the operation of which will be described more fully hereinafter whereat an audio-frequency signal representative of the modulation of the frequency-modulated subcarrier signal is derived which is, in turn, amplified by the audio-frequency amplifier 18 and reproduced by the sound reproducer 19 in a conventional manner.

*Description and Operation of Subcarrier Detector*

Referring more particularly to the subcarrier detector 17 constructed in accordance with the present invention, this detector comprises differentiating means 20, including an inductor 21, for developing a series of pulses from the amplitude-limited signal supplied by the subcarrier limiter 16. Differentiating means 20 may also include a capacitor 22 and a resistor 23. The detector 17 also includes a diode 24 for rectifying the series of pulses developed by the differentiating means 20. Finally, the detector 17 may include means 25 for deriving a signal representative of the modulation of the frequency-modulated subcarrier signal from the pulses developed by the differentiating means 20 which are retained after rectification by the diode 24. Means 25 may be a conventional integrating circuit composed of a resistor 26 and a capacitor 27.

If the inductor 21 and diode 24 are temporarily removed from the circuit and the inductor is replaced by a short circuit, the differentiating means 20 conventionally develops a series of positive and negative differentiated pulses, as indicated by the solid voltage wave form A of FIG. 2*a*, from the amplitude-limited signal supplied by the subcarrier limiter 16. When the inductor 21 is included in the circuit the difference in the operation of the differentiating means 20 is that the pulses thus developed have a slower initial decay and a faster terminal decay than the differentiated pulses developed in the absence of the inductor. The initial decay corresponds to the beginning of the decay, while the terminal decay corresponds to the end of the decay. By properly proportioning the values of the inductor 21, the capacitor 22 and the resistor 23 an oscillatory effect can be created as indicated by the dotted wave form B of FIG. 2*a*. The pulses thus developed are seen to have a faster terminal decay since they reach zero while the conventionally developed differentiated pulses decay exponentially toward zero.

When the diode 24 is included in the circuit the series of pulses developed by the differentiating means 20 is rectified. For the polarity indicated in FIG. 1, the positive pulses are shorted to ground by the diode 24. Furthermore, the diode 24 damps the oscillations developed by the differentiating means 20 so that the positive oscillations associated with the negative pulses are effectively removed. Since the positive pulses are shorted to ground by the diode 24, the negative oscillations associated therewith and shown in FIG. 2*a* are not developed. Therefore, the diode 24 in rectifying the series of pulses developed by the differentiating means 20 retains the negative pulses. The average value of these pulses, like the average value of the conventionally derived differentiated pulses, is representative of the modulation of the frequency modulated subcarrier signal. This average value may be derived from the pulses by the integrating circuit 25 which integrates or counts the pulses and develops an audio-frequency signal across the capacitor 27. The amplitude of this audio-frequency signal varies in accordance with the changes in the repetition frequency of the pulses or more particularly the modulation of the subcarrier signal.

Since the terminal decays of the pulses developed by the differentiating means 20 are faster than the terminal decays of conventionally derived differentiated pulses, the detector 17 constructed in accordance with the present invention has an improved linearity characteristic compared to the linearity characteristic of a conventional counter-type detector. This may be best illustrated by referring to FIGS. 2*a* and 2*b*. The differentiated pulses shown by the solid wave form A of FIG. 2*b*, developed from a higher frequency of the amplitude-limited signal than the differentiated pulses shown in FIG. 2*a*, have insufficient time to decay to approximately zero before the occurrence of the next differentiated pulse. There is also a reduction in the peak-to-peak amplitude of the differentiated pulses of FIG. 2*b*. Thus, there is an area or energy loss in the higher frequency differentiated pulses due to the reduction in the peak-to-peak amplitude and an insufficient time to decay. Part of this loss is shown by the cross-hatched portions of FIG. 2*b*. In order to derive an audio-frequency signal truly representative of the modulation of the frequency-modulated subcarrier signal with a counter-type detector it is necessary that the amplitude variations be dependent only upon the changes in repetition frequency of the frequency-modulated signal. In other words the area or energy content of the pulses which are counted must be constant. The amplitude variations of the audio-frequency signal derived from differentiated pulses under conditions such as shown in FIG. 2*b* will naturally also be dependent upon the variations in area or energy content of the pulses which are counted. This results in a degradation in linearity of the detector. Obviously, by decreasing the time constant of the differentiating circuit, the degradation in linearity may be minimized since the differentiated pulses, thus developed, decay to a point closer to zero at the time the next pulse is initiated. Regardless of how much the time constant is reduced there will always be at least a slight degradation in linearity since the differentiated pulses do not reach zero and therefore cannot be fully completed before the next pulse is initiated. When the time constant of the differentiating circuit is reduced, the audio recovery of the detector is naturally reduced since there is a decrease in area of the pulses which are counted. Often, this is undesirable. By including the inductor 21 in the differentiating means 20, the pulses thus developed reach zero and may therefore be fully completed before the next pulse is initiated. By properly proportioning the values of the elements of the differentiating means 20 so that the pulses are made to reach zero in an amount of time corresponding to the highest frequency to be detected, no degradation in linearity occurs since each pulse, for any frequency, is fully completed before the next pulse is initiated. This is indicated by the dotted wave form B of FIG. 2*b*. Due to the fact that the initial decay of the pulses developed by the differentiating means 20 is slower than the initial decay of the conventionally derived differentiated pulses, the area or energy content of the pulses developed by the differentiating means is at least as great as, if not greater than, the area or energy content of conventionally derived differentiated pulses. Thus, the detector 17 makes possible an improved linearity characteristic without any loss in audio recovery.

If it is found that the audio recovery of a detector constructed in accordance with the present invention is insufficient, the time constant of the differentiating means 20 may be increased. In this case, however, the linearity of the detector may become slightly degraded since each pulse may not be fully completed before the next pulse is initiated. This is indicated by the dot-dash wave form C of FIG. 2*b*. If the time constant of the differentiating means 20 is increased only up to the point where the linearity of the detector corresponds to the linearity of a conventional counter-type detector which does not have the inductor 21, the net result is improved audio recovery with no additional degradation in linearity. This is possible since a detector constructed in accordance with the present invention inherently has an improved linearity characteristic compared to the linearity characteristic of a conventional counter-type detector.

While applicant does not wish to be limited to any particular set of circuit constants, the following have proved useful in a frequency-modulation detector as represented in FIG. 1:

| | | |
|---|---|---|
| Inductor **21** | millihenries | 50 |
| Capacitor **22** | micromicrofarads | 100 |
| Resistor **23** | kilohms | 33 |
| Diode **24** | | 1N34AS |
| Resistor **26** | kilohms | 100 |
| Capacitor **27** | micromicrofarads | 1500 |
| Subcarrier frequency | kilocycles | 35–65 |

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. Apparatus for measuring the repetition rate of a repetitive signal comprising:
   means for amplitude-limiting said repetitive signal;
   differentiating means for deriving from said amplitude-limited signal a series of pulses;
   means for shaping each pulse in said series whereby each pulse so shaped has a higher energy content than corresponding ones of said series derived by said differentiating means;
   and means for rectifying said shaped series of pulses retaining a series of same polarity pulses whose average value is representative of said repetition rate and is greater than the average value of the same polarity pulses which could be obtained from the series of pulses derived by said differentiating means whereby the output of said apparatus is substantially enhanced.

2. Apparatus in accordance with claim 1 in which said shaping means includes:
   an inductor and in which each pulse so shaped decays to zero before the next pulse is initiated, has a slower initial decay and a faster terminal decay than corresponding ones in said series derived by said differentiating means whereby the linearity of said apparatus relative to the linearity obtained by said apparatus in the absence of said shaping means is substantially improved.

3. Apparatus for measuring the repetition rate of a repetitive signal comprising:
   means for amplitude-limiting said repetitive signal;

differentiating means for deriving from said amplitude-limited signal a series of pulses;
   means for shaping each pulse in said series whereby each pulse so shaped decays to zero before the next pulse is initiated, has a slower initial decay and a faster terminal decay than corresponding ones of said series derived by said differentiating means whereby the linearity of said apparatus relative to the linearity obtained by said apparatus in the absence of said shaping means is substantially improved;
   and means for rectifying said shaped series of pulses retaining a series of same polarity pulses whose average value is representative of said repetition rate.

4. Apparatus for detecting the modulation of a frequency modulated subcarrier signal comprising:
   means for amplitude-limiting said frequency modulated subcarrier signal;
   differentiating means for deriving from said amplitude-limited signal a series of pulses;
   an inductor means for shaping each pulse in said series whereby
      (A) each pulse so shaped has a higher energy content than corresponding ones of said series derived by said differentiating means and
      (B) each pulse decays to zero before the next pulse is initiated, each pulse has a slower initial decay and each pulse has a faster terminal decay than corresponding ones of said series derived by said differentiating means so that the linearity of said apparatus relative to the linearity obtained by said apparatus in the absence of said shaping means is substantially improved;
   and means for rectifying said shaped series of pulses retaining a series of same polarity pulses whose average value is representative of the modulation of said frequency modulated subcarrier signal and is greater than the average value of the same polarity pulses which could be obtained from the series of pulses derived by said differentiating means, whereby the output of said apparatus is substantially enhanced.

5. Apparatus in accordance with claim 4 in which said differentiating means includes a series combination of a resistor and capacitor, said combination coupled to said inductor means, and in which said rectifying means includes a diode connected to the junction of said capacitor and said inductor means.

References Cited in the file of this patent

UNITED STATES PATENTS

| | | |
|---|---|---|
| 2,227,906 | Kellogg | Jan. 7, 1941 |
| 2,284,444 | Peterson | May 26, 1942 |
| 2,441,957 | De Rosa | May 25, 1948 |
| 2,947,863 | Buie | Aug. 2, 1960 |